(12) United States Patent
Liu et al.

(10) Patent No.: US 9,971,504 B2
(45) Date of Patent: May 15, 2018

(54) MANAGEMENT METHOD OF HYBRID STORAGE UNIT AND ELECTRONIC APPARATUS HAVING THE HYBRID STORAGE UNIT

(71) Applicants: Chih-Chien Liu, Taipei (TW);
Chun-Sheng Chen, Taipei (TW);
Sheng-Hung Lee, Taipei (TW);
Chin-Kuo Huang, Taipei (TW);
Chin-Liang Hsu, Taipei (TW)

(72) Inventors: Chih-Chien Liu, Taipei (TW);
Chun-Sheng Chen, Taipei (TW);
Sheng-Hung Lee, Taipei (TW);
Chin-Kuo Huang, Taipei (TW);
Chin-Liang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 581 days.

(21) Appl. No.: 14/631,870

(22) Filed: Feb. 26, 2015

(65) Prior Publication Data
US 2015/0355842 A1 Dec. 10, 2015

Related U.S. Application Data

(60) Provisional application No. 62/007,917, filed on Jun. 4, 2014.

(51) Int. Cl.
*G06F 3/06* (2006.01)
(52) U.S. Cl.
CPC ............ *G06F 3/0604* (2013.01); *G06F 3/068* (2013.01); *G06F 3/0625* (2013.01); *G06F 3/0634* (2013.01); *G06F 3/0635* (2013.01); *Y02B 60/1246* (2013.01); *Y02D 10/154* (2018.01)

(58) Field of Classification Search
None
See application file for complete search history.

(56) References Cited

U.S. PATENT DOCUMENTS

| | | | | |
|---|---|---|---|---|
| 2007/0300037 | A1* | 12/2007 | Rogers | G06F 12/0292 711/202 |
| 2011/0099325 | A1* | 4/2011 | Roh | G06F 3/0619 711/103 |
| 2011/0238887 | A1* | 9/2011 | Bazzani | G06F 3/0614 711/103 |
| 2012/0059978 | A1* | 3/2012 | Rosenband | G06F 3/0613 711/103 |
| 2012/0105324 | A1* | 5/2012 | Lee | G06F 3/005 345/157 |

(Continued)

*Primary Examiner* — Sean D Rossiter
(74) *Attorney, Agent, or Firm* — JCIPRNET (57) ABSTRACT

A management method of a hybrid storage unit and an electronic apparatus of the hybrid storage unit are provided. The electronic apparatus includes a hybrid storage unit. The hybrid storage unit includes a first storage unit and a second storage unit. The second storage unit includes a first storage area and a second storage area. If a relationship between the electronic apparatus and an external apparatus is detected as being an undocked relationship, the first storage unit is disabled by a controller of the hybrid storage unit, and the second storage area serves to simulate and replace the first storage unit. The controller reports a storage unit status change notification to an operating system, so as to allow the operating system to re-enumerate the hybrid storage unit.

14 Claims, 8 Drawing Sheets

(56) References Cited

U.S. PATENT DOCUMENTS

| | | | |
|---|---|---|---|
| 2014/0181558 A1* | 6/2014 | Taha | G06F 1/3206 |
| | | | 713/323 |
| 2014/0325166 A1* | 10/2014 | Iyigun | G06F 3/0685 |
| | | | 711/158 |
| 2015/0006846 A1* | 1/2015 | Youngworth | G06F 3/0689 |
| | | | 711/216 |
| 2015/0331624 A1* | 11/2015 | Law | G06F 12/10 |
| | | | 711/103 |
| 2017/0310925 A1* | 10/2017 | Chiang | F25D 29/00 |

\* cited by examiner

MANAGEMENT METHOD OF HYBRID STORAGE UNIT AND ELECTRONIC APPARATUS HAVING THE HYBRID STORAGE UNIT

CROSS-REFERENCE TO RELATED APPLICATION

This application claims the priority benefits of U.S. provisional application Ser. No. 62/007,917, filed on Jun. 4, 2014. The entirety of the above-mentioned patent application is hereby incorporated by reference herein and made a part of this specification.

FIELD OF THE INVENTION

The invention relates to a management mechanism of a storage unit. More particularly, the invention relates to a management method of a hybrid storage unit and an electronic apparatus having the hybrid storage unit.

DESCRIPTION OF RELATED ART

A hybrid hard disk is a hard disk that combines flash memories into a conventional hard disk. In the hybrid hard disk, the frequently accessed data or the operating system is often stored in the flash memories, so as to reduce the number of rotation times of the motor of the hard disk and further reduce power. Besides, said data storage mechanism does not require a great number of flash memories, and thus the relevant costs can be reduced. Moreover, the frequently accessed data are stored in the flash memories according to a cache-access mechanism; hence, the speed of reading the data stored in the flash memories is faster than the speed of reading data stored in the hard disk. Nevertheless, the issue of the significant power consumption of the hard disk triggers the necessity of reducing the power consumption of the hybrid hard disk effectively.

SUMMARY OF THE INVENTION

The invention is directed to a management method of a hybrid storage unit and an electronic apparatus having the hybrid storage unit, whereby storage space of the hybrid storage unit can be dynamically adjusted, and power consumption can be effectively reduced.

In an embodiment of the invention, a management method of a hybrid storage unit is configured to an electronic apparatus and includes following steps. A relationship between the electronic apparatus and an external apparatus is detected. Here, the electronic apparatus includes the hybrid storage unit. The hybrid storage unit includes a first storage unit and a second storage unit. The second storage unit includes a first storage area and a second storage area. The first storage area stores an operating system, and the second storage area acts as a cache area. The relationship is a docked relationship or an undocked relationship. After the relationship between the electronic apparatus and the external apparatus is detected as being the undocked relationship, the first storage unit is disabled by a controller of the hybrid storage unit, and the second storage area is configured to simulate and replace the first storage unit. The controller reports a storage unit status change notification to an operating system, such that the operating system re-enumerates the hybrid storage unit.

In an embodiment of the invention, an electronic apparatus that includes a system on chip (SOC) and a hybrid storage unit is provided. The SOC detects a relationship between the electronic apparatus and an external apparatus. The hybrid storage unit is coupled to the SOC and includes a first storage unit, a second storage unit, and a controller. The controller is coupled to the SOC, the first storage unit, and the second storage unit. The second storage unit includes a first storage area and a second storage area. The first storage area stores an operating system, and the second storage area acts as a cache area. After the SOC detects the relationship between the electronic apparatus and the external apparatus as being an undocked relationship, the controller of the hybrid storage unit disables the first storage unit, and the second storage area is configured to simulate and replace the first storage unit. The controller reports a storage unit status change notification to the operating system, such that the operating system re-enumerates the hybrid storage unit.

According to an embodiment of the invention, the external apparatus is an external power supply apparatus or a detachable host. The electronic apparatus further includes a power management unit and an embedded unit. The power management unit is coupled to the SOC, and the electronic apparatus is connected to the external power supply apparatus through the power management unit. The embedded unit is coupled to the SOC, and the electronic apparatus is coupled to the detachable host through the embedded unit. The hybrid storage unit further includes a connector and a motor controller. The connector is coupled to the SOC. The motor controller is coupled to the controller and controls an operation of the first storage unit.

According to an embodiment of the invention, the hybrid storage unit further includes a power controller coupled to the connector and the motor controller. The power controller controls whether to supply power to the motor controller.

According to an embodiment of the invention, the SOC detects the relationship between the electronic apparatus and the external apparatus during a booting process of the electronic apparatus. After the SOC detects the relationship between the electronic apparatus and the external apparatus as being a docked relationship, the firmware unit transmits a docked notification command to the controller of the hybrid storage unit, so as to power on the motor controller to enable the first storage unit and report hardware information. After the SOC detects the relationship between the electronic apparatus and the external apparatus as being the undocked relationship, the controller continuously powers off the motor controller, the first storage unit is simulated and replaced with the second storage area, and the controller reports the storage unit status change notification to the operating system and boots the operating system.

According to an embodiment of the invention, while the first storage unit of the electronic apparatus is being operated, and if the SOC detects the relationship between the electronic apparatus and the external apparatus is changed, the SOC issues a notification to the firmware unit. The firmware unit determines whether the relationship between the electronic apparatus and the external apparatus is the undocked relationship according to the notification and transmits an undocked notification command to the controller of the hybrid storage unit if the relationship between the electronic apparatus and the external apparatus is determined to be the undocked relationship, so as to allow the controller to disable the first storage unit and simulate and replace the first storage unit with the second storage area. The controller reports the storage unit status change notification to the operating system, such that the operating system re-enumerates the hybrid storage unit.

According to an embodiment of the invention, while the first storage unit of the electronic apparatus is being operated, and if the SOC detects the relationship between the electronic apparatus and the external apparatus is changed, the SOC issues a notification to the firmware unit. The firmware unit determines whether the relationship between the electronic apparatus and the external apparatus is the docked relationship according to the notification and transmits a docked notification command to the controller of the hybrid storage unit if the relationship between the electronic apparatus and the external apparatus is determined to be the docked relationship, so as to allow the controller to enable the first storage unit. After the first storage unit is enabled, the controller synchronizes data in the second storage area with the first storage unit, and the controller reports the storage unit status change notification to the operating system, such that the operating system re-enumerates the hybrid storage unit.

According to an embodiment of the invention, wherein the SOC performs following actions by allowing the operating system to re-enumerate the hybrid storage unit: displaying a sector of the second storage area but not displaying a sector of the first storage area; displaying a display name of the second storage area to replace a display name of the first storage unit; changing a file access route to the second storage area.

According to an embodiment of the invention, the SOC performs following actions by allowing the operating system to re-enumerate the hybrid storage unit: storing a file directory of the first storage unit into the first storage area or the second storage area; still displaying a display name of the first storage area and the file directory; changing a file access route to the second storage area. After the operating system re-enumerates the hybrid storage unit, and if one data in the file directory is selected, the SOC determines whether the selected data exists in the second storage area through the controller. If the selected data does not exist in the second storage area, the SOC enables the first storage unit through the controller and copies the selected data to the second storage area, and the controller disables the first storage unit, so as to access data in the second storage area.

In view of the above, the operating system may function in a more efficient manner. Besides, when a user uses the electronic apparatus, power consumption can be reduced more effectively.

Several exemplary embodiments accompanied with figures are described in detail below to further describe the invention in details.

DETAILED DESCRIPTION OF DISCLOSED EMBODIMENTS

Figure 1:
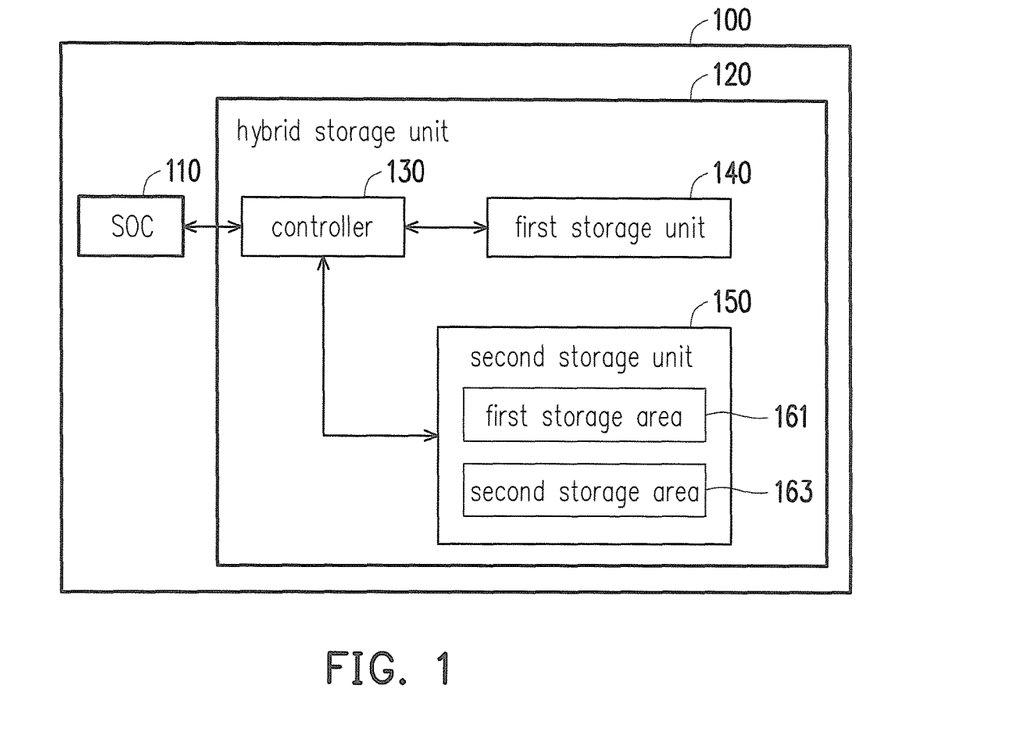
FIG. 1 is a block diagram illustrating an electronic apparatus according to an embodiment of the invention.

FIG. 1 is a block diagram illustrating an electronic apparatus according to an embodiment of the invention. With reference to FIG. 1, the electronic apparatus 100 includes a system on chip (SOC) 110 and a hybrid storage unit 120. The SOC 110 is coupled to the hybrid storage unit 120. The hybrid storage unit 120 includes a controller 130, a first storage unit 140, and a second storage unit 150. The controller 130 is coupled to the SOC 110, the first storage unit 140, and the second storage unit 150.

The SOC 110 is configured to detect a relationship between the electronic apparatus 100 and an external apparatus. The external apparatus is an external power supply apparatus or a detachable host, for instance. That is, the SOC 110 detects whether the electronic apparatus 100 is connected to an external power supply or whether the electronic apparatus 100 is embedded in a detachable host.

For example, in the hybrid storage unit 120, the first storage unit 140 is a hard disk, and the second storage unit 150 is an NAND flash or an NVRAM. Here, the second storage unit 150 includes a first storage area 161 and a second storage area 163. The first storage area 161 is configured to store an operating system and related temporary files generated while the operating system is running. The second storage area 163 acts as a cache area for storing related temporary files generated while the operating system is running.

Figure 2:
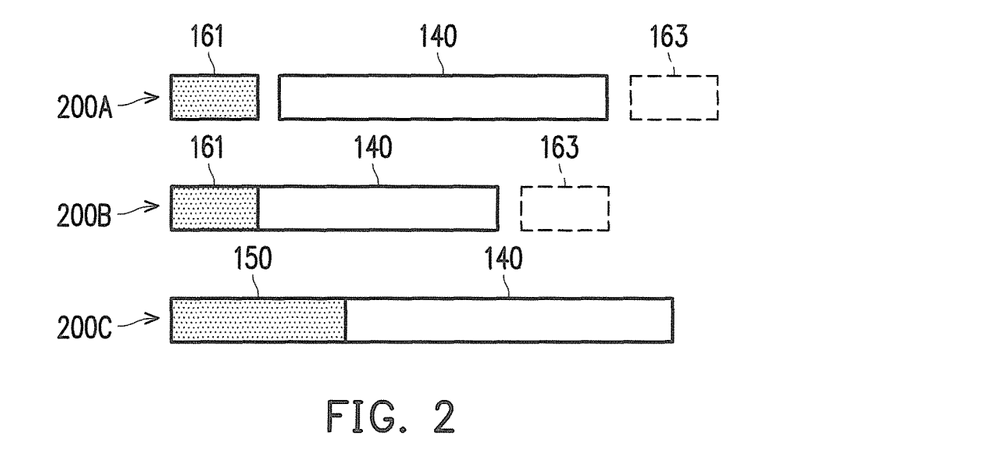
FIG. 2 is a schematic diagram illustrating several ways to arrange a hybrid storage unit according to an embodiment of the invention.

FIG. 2 is a schematic diagram illustrating several ways to arrange a hybrid storage unit according to an embodiment of the invention. The second storage unit 150 is exemplified below to elaborate the invention. To explain the invention, the capacity of the first storage area 161 and the capacity of the second storage area 163 are 8 GB, respectively, and the capacity of the first storage unit 140 is 500 GB according to the following embodiment.

According to the arrangement 200A of the hybrid storage unit 120, the first storage area 161 of the second storage unit 150 is independent from the first storage unit 140. The second storage area 163 is a hidden cache area. That is, from the user's point of view, the first storage area 161 and the first storage unit 140 are independent drives, and the total available storage capacity is 508 GB.

According to the arrangement 200B of the hybrid storage unit 120, the first storage unit 140 and the first storage area 161 are combined to form a logical sector based on a redundant array of independent disks (RAID)-like concept.

According to the arrangement 200B, the first storage area 161 of the second storage unit 150 serves to replace the former 8 GB capacity of the first storage unit 140. Thereby, the user merely observes one 500 GB drive. The second storage area 163 described herein is a hidden cache area.

According to the arrangement 200C of the hybrid storage unit 120, the first storage unit 140 and the second storage unit 150 are combined to form a logical sector based on a RAID-like concept as well. In FIG. 2C, the second storage unit 150 is placed in front of the first storage unit 140. Thereby, the user merely observes one 516 GB drive.

Figure 3:
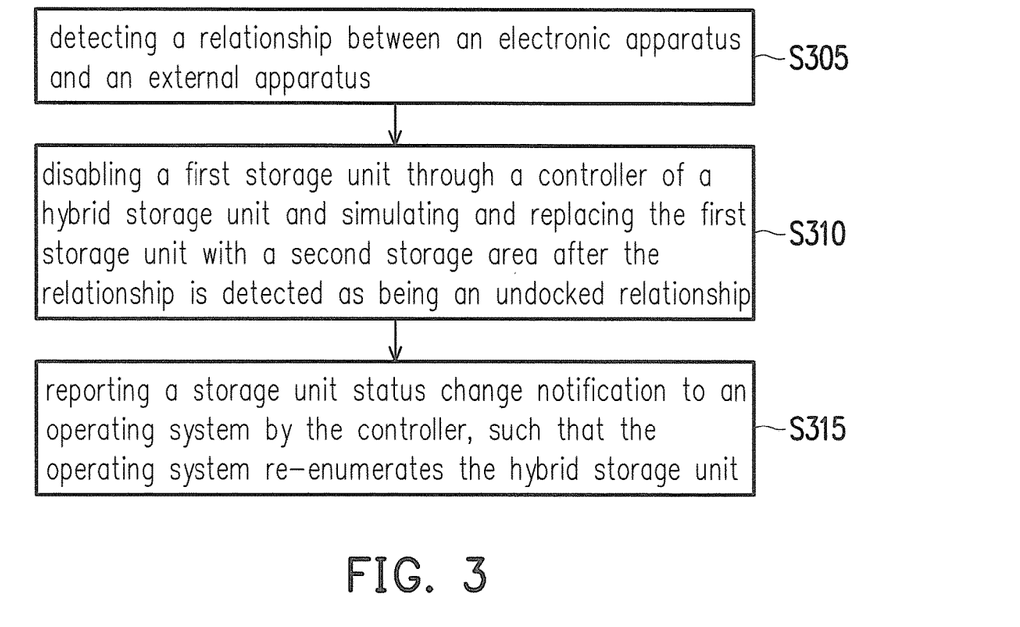
FIG. 3 is a flowchart illustrating a management method of a hybrid storage unit according to an embodiment of the invention.

FIG. 3 is a flowchart illustrating a management method of a hybrid storage unit according to an embodiment of the invention. With reference to FIG. 1 and FIG. 3, in step S305, the SOC 110 is configured to detect a relationship between the electronic apparatus 100 and an external apparatus. The external apparatus is an external power supply apparatus or a detachable host, for instance. The external power supply apparatus supplies an alternating current (AC), for instance.

In step S310, after the relationship between the electronic apparatus 100 and the external apparatus is detected as being an undocked relationship, the SOC 110 disables the first storage unit 140 through the controller 130 of the hybrid storage unit 120, and the second storage area 163 is configured to simulate and replace the first storage unit 140. Specifically, given the undocked relationship, the electronic apparatus 100 relies on the power supplied by an internal battery; in order to reduce power consumption, the controller 130 stops the first storage unit 140 from being operated and replaces the first storage unit 140 with the second storage area 163 that requires less power consumption.

Figure 4:
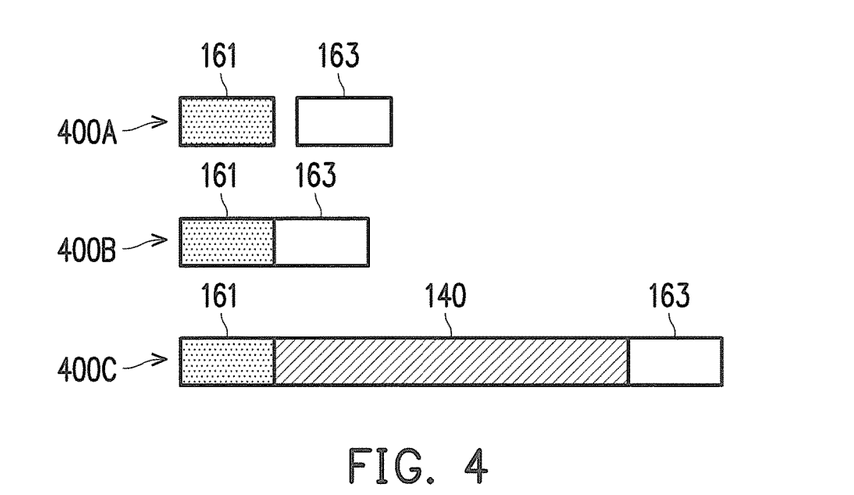
FIG. 4 is a schematic diagram illustrating a way to arrange virtual storage space according to an embodiment of the invention.

FIG. 4 is a schematic diagram illustrating a way to arrange virtual storage space according to an embodiment of the invention. In the present embodiment, in case that the first storage unit 140 stops running, the second storage area 163 serves as virtual storage space and replaces the first storage unit 140.

According to the arrangement 400A of virtual storage space, if the first storage unit 140 stops running, the second storage area 163 acting as the virtual storage space is independent from the first storage area 161. That is, the user observes two independent drives, i.e., the first storage area 161 and the second storage area 163.

According to the arrangement 400B of virtual storage space, if the first storage unit 140 stops running, the first storage area 161 and the second storage area 163 collectively refer to one drive.

According to the arrangement 400C of virtual storage space, although the first storage unit 140 stops running, the first storage unit 140 is visible, and the first storage area 161, the second storage area 163, and the first storage unit 140 collectively refer to one drive. Given the arrangement 400C, a file directory of the first storage unit 140 is stored into the first storage area 161 or the second storage area 163 in advance. If the first storage unit 140 stops running, and if the user selects one data in the file directory, the second storage area 163 acting as the cache area is searched to determine whether the selected data exists or not; if yes, the selected data is directly accessed. If not, the first storage unit 140 is enabled; after the selected data is copied to the second storage area 163, the first storage unit 140 is disabled. Thereby, the selected data in the file directory can be accessed through the second storage area 163.

Given the arrangement 400C, the file directory of the first storage unit 140 whose data does not exist in the cache area (i.e., the second storage area 163) may be visually displayed in various manner, e.g., a gray-scale manner.

In step S315, the controller 130 reports a storage unit status change notification to an operating system, such that the operating system re-enumerates the hybrid storage unit 120. The storage unit status change notification is a disk status change notification, for instance. The operating system can be informed of the currently available storage capacity and the change to the file storage location, and the operating system further changes the file access route to the second storage area 163.

Figure 5:
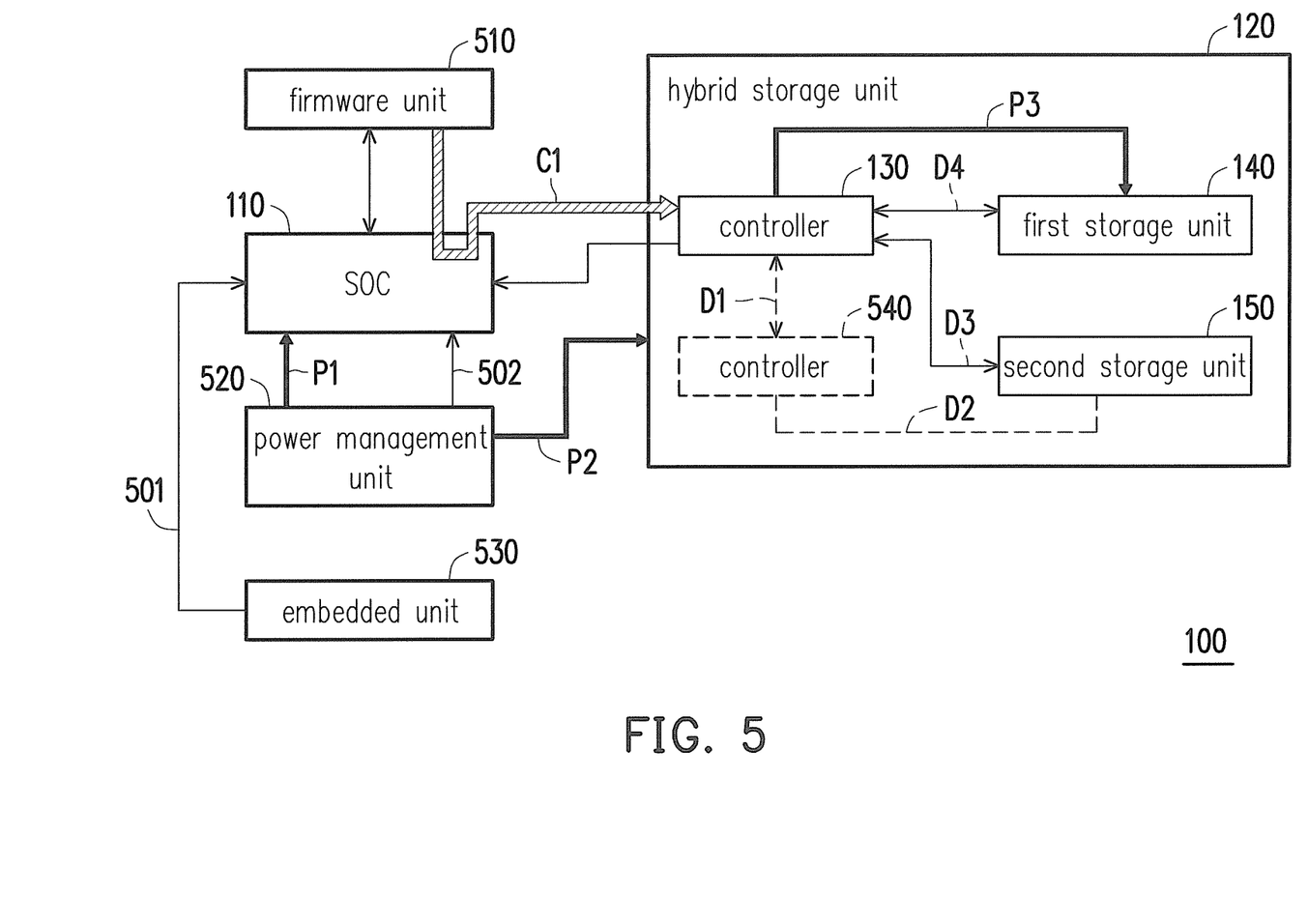
FIG. 5 is a block diagram illustrating an application example of an electronic apparatus according to an embodiment of the invention.

FIG. 5 is a block diagram illustrating an application example of an electronic apparatus according to an embodiment of the invention. The present embodiment provides an application example of the electronic apparatus 100 as depicted in FIG. 1. In the present embodiment, the electronic apparatus 100 further includes a firmware unit 510, a power management unit 520, an embedded unit 530, and a controller 540.

The firmware unit 510 is, for instance, a read only memory (ROM) configured to store a basic input output system (BIOS), a unified extensible firmware interface (UEFI) BIOS, or other firmware. The power management unit 520 is configured to connect an external power supply apparatus or an internal battery, and the embedded unit 530 is configured to connect a detachable host. For instance, the embedded unit 530 is a docking station. The power management unit 520 and the embedded unit 530 are coupled to the SOC 110 respectively through a detection pin 502 and a detection pin 501. The SOC 110 determines whether the power management unit 520 is connected to the external power supply apparatus according to a signal transmitted from the detection pin 502 and determines whether the embedded unit 530 is connected to the detachable host according to a signal transmitted from the detection pin 501. Here, the detection pins 502 and 501 are general purpose I/O (GPIO) pins.

According to the present embodiment, the firmware unit 510 is coupled to the SOC 110 through a serial peripheral interface (SPI). The SOC 110 is coupled to the hybrid storage unit 120 through a serial advanced technology attachment (SATA) interface. The firmware unit 510 issues a command to the hybrid storage unit 120 through the SOC 110, as shown by a command transmission route C1.

The power management unit 520 supplies power to the SOC 110 and the hybrid storage unit 120 respectively through a power supply circuit P1 and a power supply circuit P2. In the hybrid storage unit 120, the power is supplied to the first storage unit 140 through the controller 130 and a power supply circuit P3.

As shown in FIG. 5, the controller 130 may access data in the first storage unit 140 and the second storage unit 150 through a data transmission circuit D3 and a data transmission circuit D4, respectively. The controller 540 may be additionally arranged in the electronic apparatus 100, i.e., whether to integrate the controller 540 into the electronic apparatus 100 is optional. The controller 140 (i.e., the primary controller) controls the controller 540 (i.e., the secondary controller) through the data transmission circuit D1, such that the controller 540 accesses data in the second storage unit 150 through the data transmission circuit D2.

Figure 6:
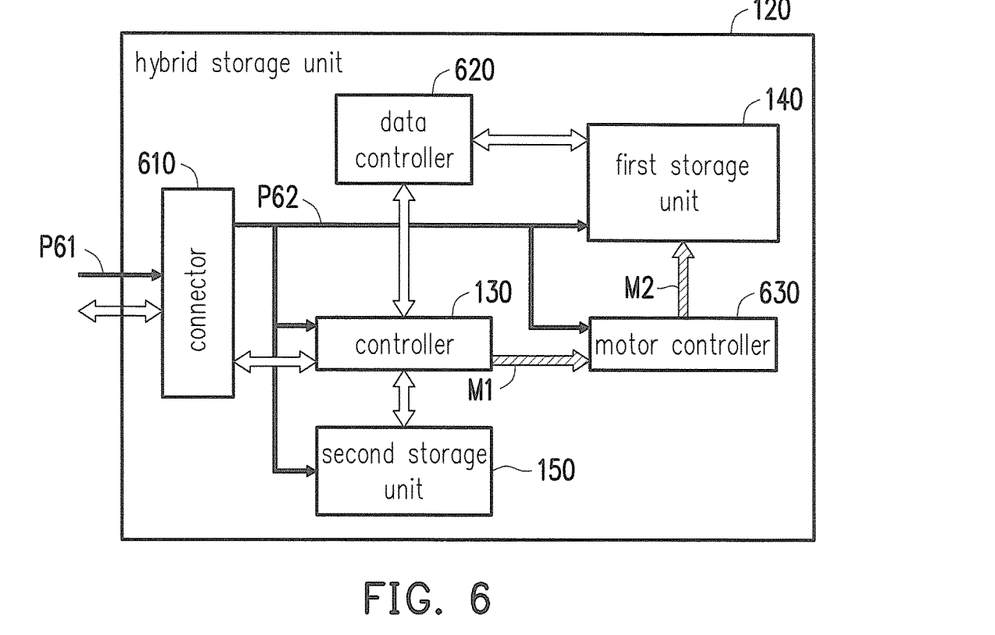
FIG. 6 is a schematic diagram illustrating a power transmission route of a hybrid storage unit according to an embodiment of the invention.

FIG. 6 is a schematic diagram illustrating a power transmission route of a hybrid storage unit according to an embodiment of the invention. In the present embodiment, the hybrid storage unit 120 includes a connector 610, a data controller 620, and a motor controller 630. The motor controller 630 is connected to the first storage unit 140, so as to determine whether the first storage unit 140 is operated or not. For instance, the controller 130 issues a command to the motor controller 630 through a motor control circuit M1, and the motor controller 630 determines whether the first storage unit 140 is operated or not by controlling the motor control circuit M2. Through the data controller 620, the controller 130 accesses the data in the first storage unit 140.

The power is transmitted to the connector 610 of the hybrid storage unit 120 through a power transmission circuit P61. The connector 610 transmits the power to the first storage unit 140, the controller 130, the second storage unit 150, and the motor controller 630 through a power transmission circuit P62. In addition, the hollow arrows in the drawings stand for the data transmission routes.

Figure 7:
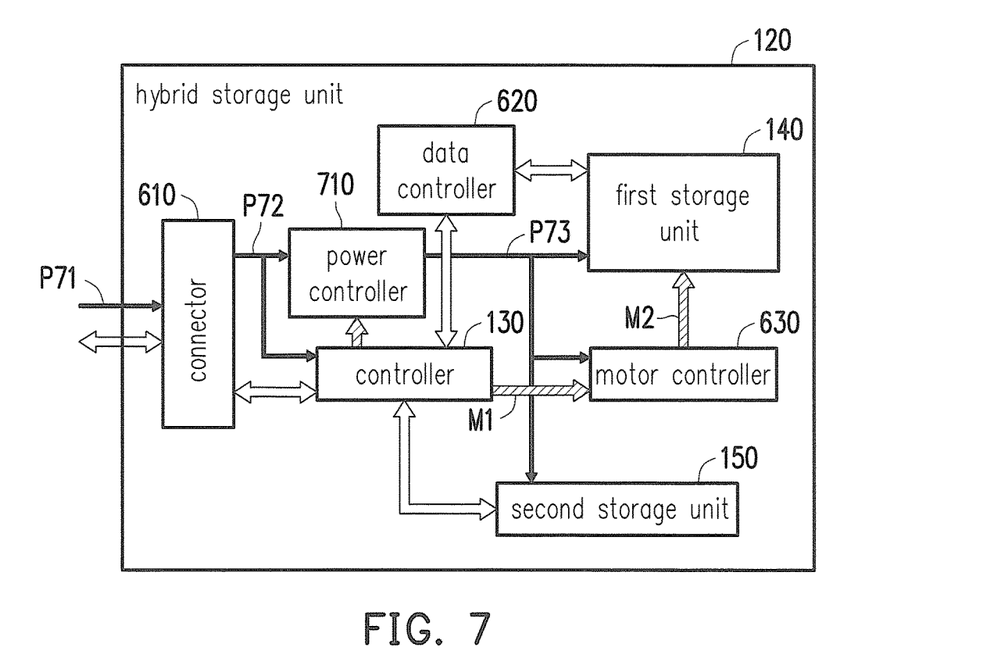
FIG. 7 is a schematic diagram illustrating a power transmission route of a hybrid storage unit according to another embodiment of the invention.

FIG. 7 is a schematic diagram illustrating a power transmission route of a hybrid storage unit according to another embodiment of the invention. In the present embodiment, the hybrid storage unit 120 further includes a power controller 710. The power is transmitted to a controller 610 of the hybrid storage unit 120 through a power transmission circuit P71, and the controller 610 transmits the power to the power controller 710 and the controller 130 through a power transmission circuit P72. The power controller 710 is coupled to the first storage unit 140, the second storage unit 150, and the motor controller 630 through a power transmission circuit P73. The controller 130 issues a command to the power controller 710, such that the power controller 710 determines whether to transmit power to the first storage unit 140 and the motor controller 630. Here, the hollow arrows in the drawings stand for the data transmission routes.

Figure 8:
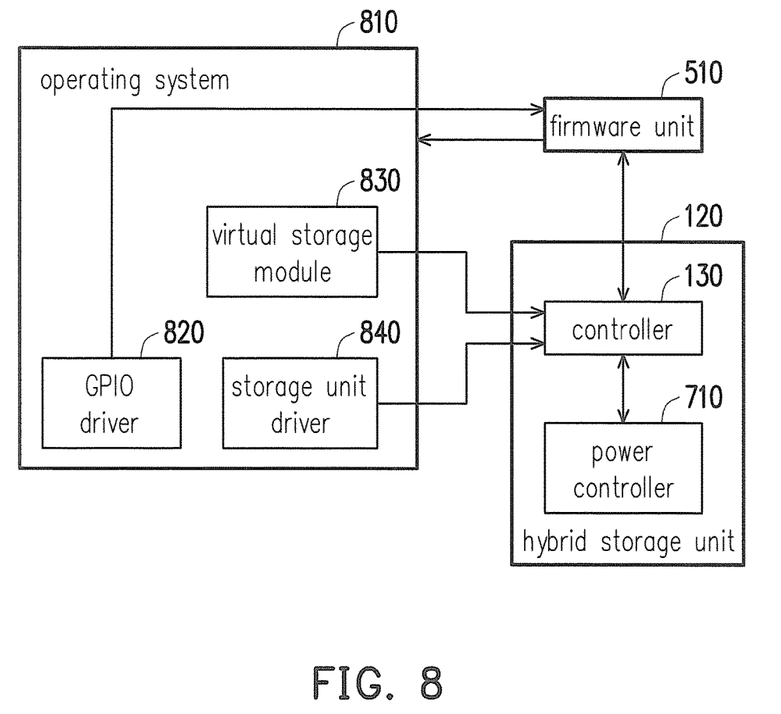
FIG. 8 is a schematic diagram illustrating an operating system manages a hybrid storage unit according to an embodiment of the invention.

FIG. 8 is a schematic diagram illustrating an operating system manages a hybrid storage unit according to an embodiment of the invention. With reference to FIG. 1 and FIG. 5-FIG. 8, the operating system 810 is stored in the first storage area 161 of the second storage unit 150 of the hybrid storage unit 120. The operating system 810 includes a GPIO driver 820, a virtual storage module 830, and a storage unit driver module 840. The GPIO driver 820 is configured to determine whether the power management unit 520 and the embedded unit 530 are assembled to or disassembled from any external apparatus according to the signals received by the detection pins 502 and 501 and notify the firmware unit 510. The firmware unit 510 notifies the operating system 810 directly or through the virtual storage module 830 according to whether the power management unit 520 and the embedded unit 530 are assembled to or disassembled from any external apparatus.

The storage unit driver 840 is responsible for transmitting the data to the controller 130 of the hybrid storage unit 120. After receiving the storage unit status change notification transmitted by the firmware unit 510, the virtual storage module 830 simulates and replaces the first storage unit 140 with the second storage area 163. For instance, the file access route is changed to the second storage area 163. The virtual storage module 830 further stores the file directory of the first storage unit 140 into the first storage area 161 or the second storage area 163.

Figure 9:
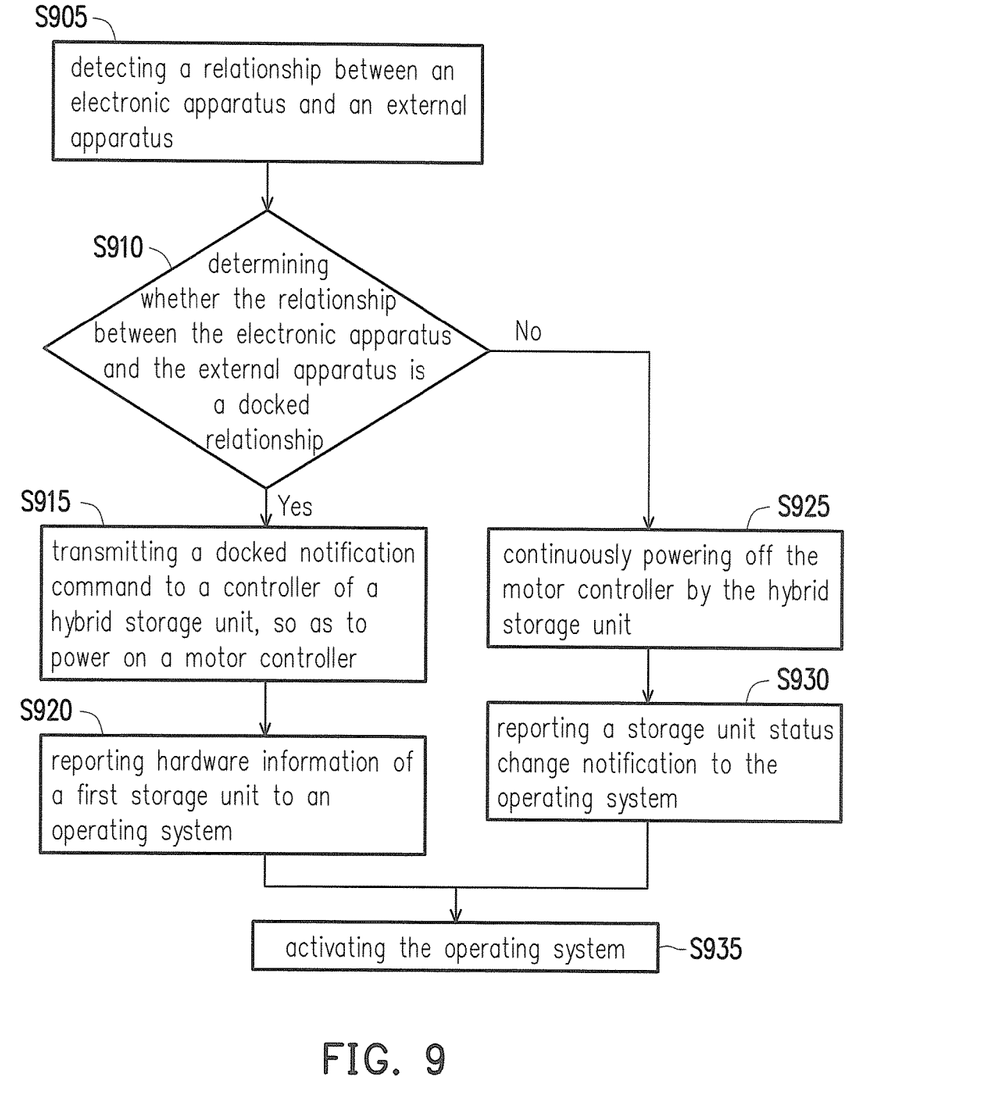
FIG. 9 is a flowchart illustrating a management method of a hybrid storage unit during a booting process according to an embodiment of the invention.

FIG. 9 is a flowchart illustrating a management method of a hybrid storage unit during a booting process according to an embodiment of the invention. Please refer to FIG. 1 and FIG. 5-FIG. 8 together with the following explanation.

In step S905, during a booting process, the SOC 110 detects the relationship between the electronic apparatus 100 and the external apparatus. In step S910, the firmware unit 510 determines whether the relationship between the electronic apparatus 100 and the external apparatus is a docked relationship. For instance, the SOC 110 enables the GPIO driver 820 to determine whether the signal transmitted by the detection pin 501 or the detection unit 502 is received.

After receiving the signal transmitted by the detection pin 501 or the detection unit 502, the firmware unit 510 determines whether the relationship between the power management unit 520 or the embedded unit 530 and the external apparatus is the docked relationship.

After the relationship between the electronic apparatus 100 and the external apparatus is detected as being the docked relationship, the firmware unit 510 in step S915 transmits a docked notification command to the controller 130 of the hybrid storage unit 120, so as to power on the motor controller 630 to enable the first storage unit 140. The firmware unit 510 issues the docked notification command to controller 130 of the hybrid storage unit 120 through the SOC 110, as shown by the command transmission route C1 in FIG. 5.

In step S920, the controller 130 reports hardware information of the first storage unit 140 to the operating system 810. In step S935, the SOC 110 activates the operating system 810.

After the relationship between the electronic apparatus 100 and the external apparatus is detected as being an undocked relationship, in step S925, the hybrid storage unit 120 continuously powers off the motor controller 630 through the controller 130, and the virtual storage module 830 simulates and replaces the first storage unit 140 with the second storage area 163. In step S930, the controller 130 reports the storage unit status change notification to the operating system 810. In step S935, the SOC 110 activates the operating system 810.

Figure 10:
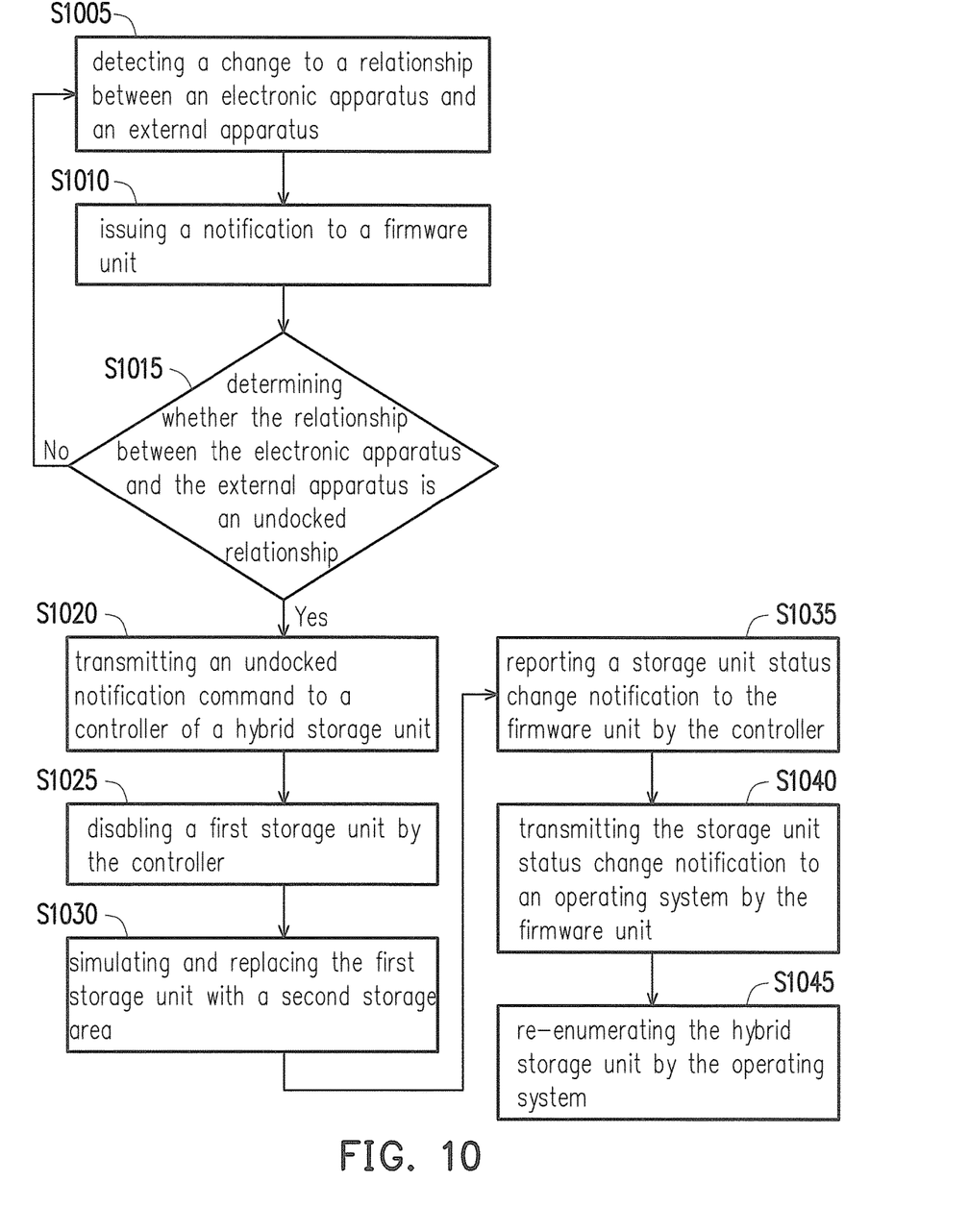
FIG. 10 is a flowchart illustrating a management method of a hybrid storage unit after the booting process is performed according to an embodiment of the invention.

FIG. 10 is a flowchart illustrating a management method of a hybrid storage unit after the booting process is performed according to an embodiment of the invention. Please refer to FIG. 1 and FIG. 5-FIG. 8 together with the following explanation. According to the present embodiment, if the relationship between the power management unit 520 and the external apparatus is the docked relationship, the first storage unit 140 is applied; if the relationship between the power management unit 520 and the external apparatus is the undocked relationship, the first storage unit 140 is not applied.

In step S1005, while the first storage unit 140 is being operated, the SOC 110 detects a change to the relationship between the electronic apparatus 100 and the external apparatus. In step S1010, the SOC 110 issues a notification to the firmware unit 510. From the software point of view as shown in FIG. 8, the GPIO driver 820 notifies the firmware unit 510 if detecting the command transmitted by the detection pin 502.

In step S1015, the firmware unit 510 determines whether the relationship between the electronic apparatus 100 and the external apparatus is an undocked relationship. After the relationship between the electronic apparatus 100 and the external apparatus is detected as not being the undocked relationship, go back to step S1005. If the relationship between the electronic apparatus 100 and the external apparatus is detected as being the undocked relationship, in step S1020, the firmware unit 510 transmits an undocked notification command to the controller 130 of the hybrid storage unit 120.

Furthermore, in step S1025, the controller 130 disables the first storage unit 140. For instance, as illustrated in FIG. 6, the controller 130 issues a disabling command to the motor controller 630 through the motor control circuit M1, such that the motor controller 630 can stop the operation of the first storage unit 140. Besides, as exemplarily shown in FIG. 7, the controller 130 may issue a disabling command to the power controller 710, such that the power controller 710 may stop supplying power to the first storage unit 140.

In step S1030, the controller 130 simulates and replaces the first storage unit 140 with the second storage area 163. From the software point of view as shown in FIG. 8, the virtual storage module 830 changes the file access route of the controller 130 from the first storage unit 140 to the second storage area 163, so as to simulate and replace the first storage unit 140 with the second storage area 163.

In step S1035, the controller 130 reports the storage unit status change notification to the firmware unit 510. In step S1040, the firmware unit 510 transmits the storage unit status change notification to the operating system 810. In step S1045, the operating system 810 re-enumerates the hybrid storage unit 120.

When the first storage unit 140 is disabled according to actual requirements, the user may manage the settings in two different manners: not displaying the sector of the first storage unit 140 or displaying the sector of the first storage unit 140 in a regular manner or in a gray-scale manner. However, the user is unable to access or click on the file directory of the first storage unit 140.

According to the arrangement 400A and the arrangement 400B of the virtual storage space shown in FIG. 4, the virtual storage module 830 does not display the sector of the first storage area 140 but displays the sector of the second storage area 163; a display name of the second storage area 163 is displayed to replace a display name of the first storage unit 140; a file access route is changed to the second storage area 160.

As to the arrangement 400C of the virtual storage space shown in FIG. 4, the virtual storage module 830 stores the file directory of the first storage unit 140 into the first storage area 161 or the second storage area 163, and the sector, the display name, and the file directory of the first storage area 140 are still displayed. The virtual storage module 830 also changes the file access route to the second storage area 163. After the step S1045 is performed, if one data in the file directory is selected, the controller 130 determines whether the selected data exists in the second storage area 163. If the selected data does not exist in the second storage area 163, the first storage unit 140 is enabled (e.g., power is temporarily supplied to the first storage unit 140), and the selected data is copied to the second storage area 163. The first storage unit 140 is disabled, such that the data can be subsequently accessed merely through the second storage area 163.

Figure 11:
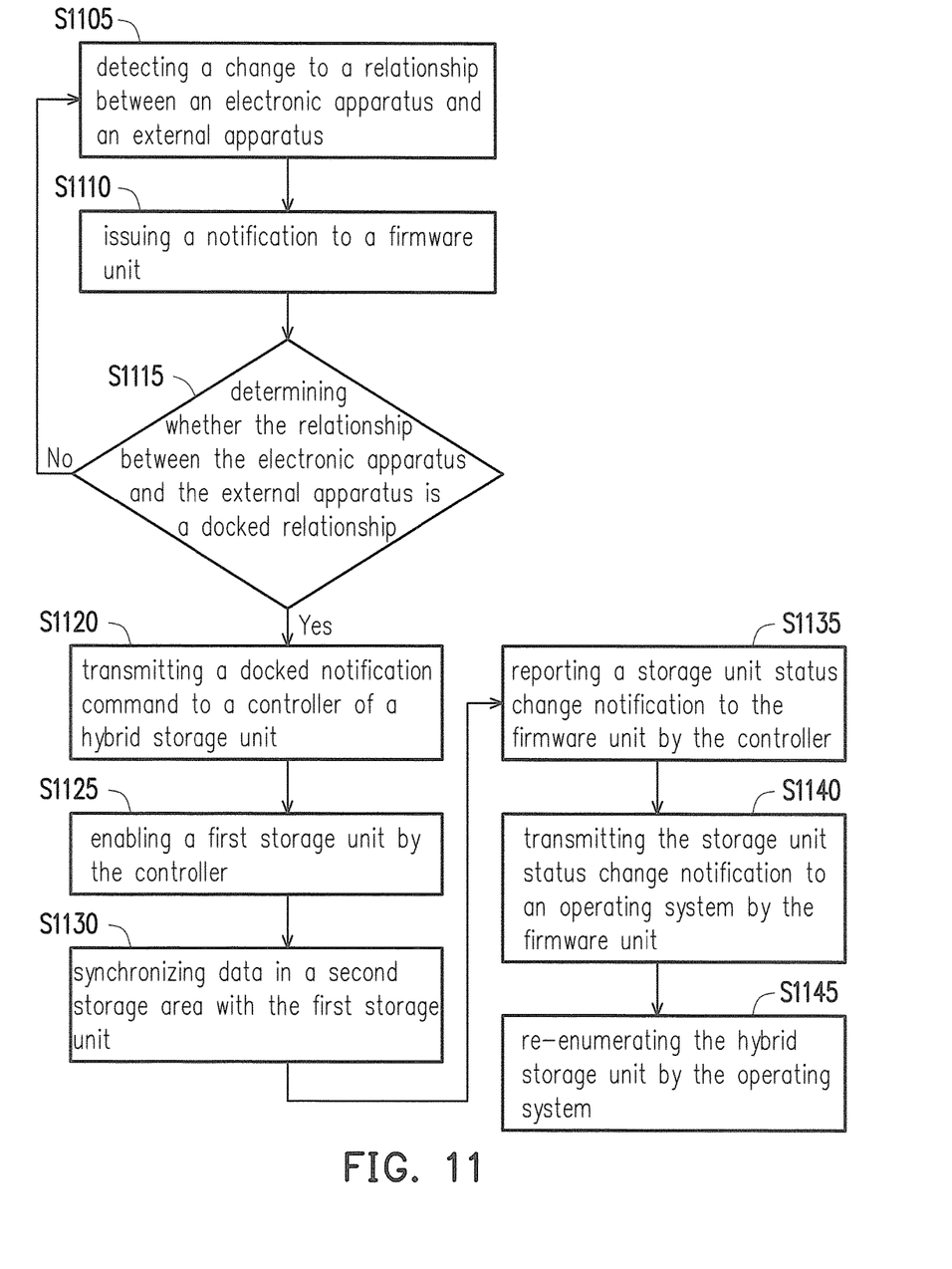
FIG. 11 is a flowchart illustrating a management method of a hybrid storage unit after the booting process is performed according to another embodiment of the invention.

FIG. 11 is a flowchart illustrating a management method of a hybrid storage unit after the booting process is performed according to another embodiment of the invention. Please refer to FIG. 1 and FIG. 5-FIG. 8 together with the following explanation. According to the present embodiment, if the relationship between the power management unit 520 and the external apparatus is the docked relationship, the first storage unit 140 is applied; if the relationship between the power management unit 520 and the external apparatus is the undocked relationship, the first storage unit 140 is not applied.

In step S1105, while the first storage unit 140 is being disabled, the SOC 110 detects a change to the relationship between the electronic apparatus 100 and the external apparatus. In step S1110, the SOC 110 issues a notification to the firmware unit 510. In step S1115, the firmware unit 510 determines whether the relationship between the electronic apparatus 100 and the external apparatus is the docked relationship. If the relationship is not the docked relationship, go back to step S1105.

If the relationship between the electronic apparatus 100 and the external apparatus is detected as being the docked relationship, in step S1120, the firmware unit 510 transmits a docked notification command to the controller 130 of the hybrid storage unit 120. In step S1125, the controller 130 enables the first storage unit 140. For instance, as illustrated in FIG. 6, the controller 130 issues an enabling command to the motor controller 630 through the motor control circuit M1, such that the motor controller 630 can determine whether the first storage unit 140 is operated or not. Besides, as exemplarily shown in FIG. 7, the controller 130 may issue an enabling command to the power controller 710, such that the power controller 710 may start supplying power to the first storage unit 140.

After the first storage unit 140 is enabled, in step S1130, the controller 130 synchronizes data in the second storage area 163 with the first storage unit 140. Namely, the controller 130 synchronizes the data that is in the second storage area 163 and has been accessed (read/written) by the user during the time period (i.e. the period of simulating and replacing the first storage unit 161 with the second storage area 163) with the first storage unit 140, and the controller 130 then hides the second storage area 163.

In step S1135, the controller 130 reports the storage unit status change notification to the firmware unit 510. In step S1140, the firmware unit 510 transmits the storage unit status change notification to the operating system 810. In step S1145, the operating system 810 re-enumerates the hybrid storage unit 120.

That is, when the power supply source of the electronic apparatus 100 is switched from the internal battery to the external AC supply, or when the relationship between the electronic apparatus 100 and the detachable host is changed from the undocked relationship to the docked relationship, the BIOS notifies the controller 130 of the hybrid storage unit 120 to supply power to the first storage unit 140 (e.g., a hard disk) and displaying the sector of the first storage unit 140. Additionally, files that are in the second storage area 163 (e.g., a flash memory) and have been accessed by the user during the time period (i.e. the period of simulating and replacing the first storage unit 161 with the second storage area 163) are synchronized with the first storage unit 140, and the second storage area 163 is hidden.

To sum up, once the relationship between the electronic apparatus and the external apparatus is changed from the docked relationship to the undocked relationship, the first storage unit is no longer used and is simulated and replaced by another storage area; if the relationship between the electronic apparatus and the external apparatus is changed from the undocked relationship to the docked relationship, the first storage unit is being used. In case that the first storage unit is the rotatable disk that consumes more power, the memory that is installed in the electronic apparatus and consumes less power may serve as the second storage unit, such that the operating system can be running more efficiently. Moreover, whether the rotatable disk runs or stops running can be dynamically adjusted according to the power supplied to the electronic apparatus, so as to reduce power consumption more effectively while the user uses the electronic apparatus.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A management method of a hybrid storage unit, the management method being configured to an electronic apparatus and comprising:
   detecting a relationship between the electronic apparatus and an external apparatus, wherein the electronic apparatus comprises the hybrid storage unit, the hybrid storage unit comprises a first storage unit and a second storage unit, the second storage unit comprises a first storage area and a second storage area, the first storage area stores an operating system, the second storage area acts as a cache area, and the relationship is a docked relationship or an undocked relationship;
   after detecting the relationship between the electronic apparatus and the external apparatus as being the undocked relationship, disabling the first storage unit through a controller of the hybrid storage unit and replacing the first storage unit with the second storage area; and
   reporting a storage unit status change notification to the operating system by the controller, such that the operating system re-enumerates the hybrid storage unit.

2. The management method according to claim 1, wherein the step of re-enumerating the hybrid storage unit by the operating system comprises:
   displaying a sector of the second storage area but not displaying a sector of the first storage area;
   displaying a display name of the second storage area to replace a display name of the first storage unit; and
   changing a file access route to the second storage area.

3. The management method according to claim 1, wherein the step of re-enumerating the hybrid storage unit by the operating system comprises:
   storing a file directory of the first storage unit into the first storage area or the second storage area;
   still displaying the display name of the first storage area and the file directory; and
   changing a file access route to the second storage area,
   wherein after the operating system re-enumerates the hybrid storage unit, the management method further comprises:
   if one data in the file directory is selected, determining whether the selected data exists in the second storage area; and
   if the selected data does not exist in the second storage area, enabling the first storage unit and copying the selected data to the second storage area, and disabling the first storage unit to access the data through the second storage area.

4. The management method according to claim 1, further comprising:
   during a booting process, detecting the relationship between the electronic apparatus and the external apparatus by a system on chip;
   if the relationship is detected as being the docked relationship, the management method comprising:
       transmitting a docked notification command to the controller of the hybrid storage unit through a firmware unit, so as to power on a motor controller to enable the first storage unit and report hardware information, wherein the motor controller controls an operation of the first storage unit;
   if the relationship is detected as being the undocked relationship, the method comprising:
       continuously powering off the motor controller through the controller and replacing the first storage unit with the second storage area; and
       reporting the storage unit status change notification to the operating system by the controller; and
   activating the operating system.

5. The management method according to claim 1, further comprising:
   if a change to the relationship between the electronic apparatus and the external apparatus is detected while the first storage unit is being operated, issuing a notification to the firmware unit;
   determining whether the relationship is the undocked relationship by the firmware unit according to the notification;
   after detecting the relationship between the electronic apparatus and the external apparatus as being the undocked relationship, transmitting an undocked notification command to the controller of the hybrid storage unit by the firmware unit, such that the controller disables the first storage unit, and the first storage unit is replaced with the second storage area; and
   reporting the storage unit status change notification to the operating system by the controller, so as to allow the operating system to re-enumerate the hybrid storage unit.

6. The management method according to claim 1, further comprising:
   if a change to the relationship between the electronic apparatus and the external apparatus is detected while the first storage unit is being disabled, issuing a notification to the firmware unit;
   determining whether the relationship is the docked relationship by the firmware unit according to the notification;
   after detecting the relationship between the electronic apparatus and the external apparatus as being the docked relationship, transmitting a docked notification command to the controller of the hybrid storage unit by the firmware unit, such that the controller disables the first storage unit;
   synchronizing data in the second storage area with the first storage unit after the first storage unit is enabled; and
   reporting the storage unit status change notification to the operating system by the controller, so as to allow the operating system to re-enumerate the hybrid storage unit.

7. An electronic apparatus comprising:
   a system on chip detecting a relationship between the electronic apparatus and an external apparatus; and
   a hybrid storage unit coupled to the system on chip, the hybrid storage unit comprising:
   a first storage unit;
   a second storage unit comprising a first storage area and a second storage area, wherein the first storage area stores an operating system, and the second storage area acts as a cache area;
   a controller coupled to the system on chip, the first storage unit, and the second storage unit;
   after the system on chip detects the relationship between the electronic apparatus and the external apparatus as being an undocked relationship, the controller of the hybrid storage unit disabling the first storage unit, the second storage area being configured to replace the first storage unit, the controller reporting a storage unit status change notification to the operating system, so as to allow the operating system to re-enumerate the hybrid storage unit.

8. The electronic apparatus according to claim 7, wherein the external apparatus is an external power supply apparatus or a detachable host, and the electronic apparatus further comprises:
- a power management unit coupled to the system on chip, wherein the electronic apparatus is connected to the external power supply apparatus through the power management unit;
- an embedded unit coupled to the system on chip, wherein the electronic apparatus is coupled to the detachable host through the embedded unit,
- the hybrid storage unit further comprising:
- a connector coupled to the system on chip; and
- a motor controller coupled to the controller, the motor controller controlling an operation of the first storage unit.

9. The electronic apparatus according to claim 8, wherein the hybrid storage unit further comprises: a power controller coupled to the connector and the motor controller, the power controller controlling whether to supply power to the motor controller.

10. The electronic apparatus according to claim 8, wherein the system on chip detects the relationship between the electronic apparatus and the external apparatus during a booting process of the electronic apparatus,
- after the system on chip detects the relationship between the electronic apparatus and the external apparatus as being a docked relationship, the firmware unit transmits a docked notification command to the controller of the hybrid storage unit, so as to power on the motor controller to enable the first storage unit and report hardware information;
- after the system on chip detects the relationship between the electronic apparatus and the external apparatus as being the undocked relationship, the controller continuously powers off the motor controller, the first storage unit is replaced with the second storage area, and the controller reports the storage unit status change notification to the operating system and boots the operating system.

11. The electronic apparatus according to claim 8, wherein while the first storage unit is being operated, and if the system on chip detects the relationship between the electronic apparatus and the external apparatus is changed, the system on chip issues a notification to the firmware unit,
- the firmware unit determines whether the relationship between the electronic apparatus and the external apparatus is the undocked relationship according to the notification and transmits an undocked notification command to the controller of the hybrid storage unit if the relationship between the electronic apparatus and the external apparatus is determined to be the undocked relationship, so as to allow the controller to disable the first storage unit and replace the first storage unit with the second storage area, and
- the controller reports the storage unit status change notification to the operating system, such that the operating system re-enumerates the hybrid storage unit.

12. The electronic apparatus according to claim 8, wherein while the first storage unit is being disabled, and if the system on chip detects the relationship between the electronic apparatus and the external apparatus is changed, the system on chip issues a notification to the firmware unit,
- the firmware unit determines whether the relationship between the electronic apparatus and the external apparatus is a docked relationship according to the notification and transmits a docked notification command to the controller of the hybrid storage unit if the relationship between the electronic apparatus and the external apparatus is determined to be the docked relationship, so as to allow the controller to enable the first storage unit,
- after the first storage unit is enabled, the controller synchronizes data in the second storage area with the first storage unit, and the controller reports the storage unit status change notification to the operating system, such that the operating system re-enumerates the hybrid storage unit.

13. The electronic apparatus according to claim 7, wherein the system on chip performs following actions by allowing the operating system to re-enumerate the hybrid storage unit: displaying a sector of the second storage area but not displaying a sector of the first storage area; displaying a display name of the second storage area to replace a display name of the first storage unit; changing a file access route to the second storage area.

14. The electronic apparatus according to claim 7, wherein the system on chip performs following actions by allowing the operating system to re-enumerate the hybrid storage unit: storing a file directory of the first storage unit into the first storage area or the second storage area; still displaying a display name of the first storage area and the file directory; changing a file access route to the second storage area,
- wherein after the operating system re-enumerates the hybrid storage unit, and if one data in the file directory is selected, the system on chip determines whether the selected data exists in the second storage area through the controller; if the selected data does not exist in the second storage area, the system on chip enables the first storage unit through the controller and copies the selected data to the second storage area, and the controller disables the first storage unit, so as to access data in the second storage area.

* * * * *